United States Patent [19]

Illingworth

[11] Patent Number: 5,444,357

[45] Date of Patent: Aug. 22, 1995

[54] METHOD AND APPARATUS FOR THREE-PHASE VOLTAGE DOUBLING

[75] Inventor: Lewis Illingworth, Kensington, N.H.

[73] Assignee: Avionic Instruments, Inc., Avenel, N.J.

[21] Appl. No.: 22,990

[22] Filed: Feb. 26, 1993

[51] Int. Cl.⁶ .............................................. H02M 7/19
[52] U.S. Cl. ................................... 363/87; 361/61; 361/126
[58] Field of Search ................ 363/61, 87, 89, 59, 363/60, 125, 126, 129

[56] References Cited

U.S. PATENT DOCUMENTS

| | | | |
|---|---|---|---|
| 3,764,886 | 10/1973 | Zarowin | 321/15 |
| 4,184,075 | 1/1980 | Ebersberger | 250/402 |
| 4,270,166 | 5/1981 | Immler | 363/89 |
| 4,545,464 | 10/1985 | Nomura | 187/29 R |
| 4,599,687 | 7/1986 | Smith | 363/61 |
| 4,807,105 | 2/1989 | Varjasi et al. | 363/126 |
| 4,853,557 | 8/1989 | Meier et al. | 307/10.1 |
| 4,992,920 | 2/1991 | Davis | 363/36 |
| 5,200,887 | 4/1993 | Ioroi et al. | 363/143 |

FOREIGN PATENT DOCUMENTS 313273 3/1970 U.S.S.R. .................... 363/61

OTHER PUBLICATIONS

Kozlov et al. Three Phase Rectifier Circuits with Voltage Tripling. Instrum. & Expo Tech (USA) vol. 23, No. 3 pg. 2 Dec. '80.

Primary Examiner—Steven L. Stephan
Assistant Examiner—Adolf Berhane
Attorney, Agent, or Firm—Ward & Olivo

[57] ABSTRACT

A circuit and method for converting three-phase Δ AC to a higher voltage DC output. The method utilizes first, second and third rectifying circuits and a storage circuit to provide DC. The circuit herein does not require an independent DC power source, nor a neutral AC connection, as used for conventional Y connected power systems. The circuit herein also provides a uniform loading to all three phases of the AC input. A preferred embodiment is provided herein comprised of twelve diodes and three capacitors, wherein the diodes rectify the current, and the capacitors store charge.

18 Claims, 2 Drawing Sheets

METHOD AND APPARATUS FOR THREE-PHASE VOLTAGE DOUBLING

FIELD OF THE INVENTION

The present invention relates generally to the field of power conversion circuits and, more specifically, to three-phase power conversion circuits of the sort useful in automotive and marine applications.

BACKGROUND OF THE INVENTION

Typical automotive or marine alternators generate alternating current (AC) signals in three phases, each phase leading of lagging the others by 120 degrees. Such three-phase AC power can be coupled from a generator to a power converter in two different ways: (1) a Y-configuration in which three wires each carry a different phase and a fourth wire carries a neutral reference voltage; or (2) a Δ-configuration in which only the first three "active" wires are used. In applications where Δ-configurations are used, the neutral reference voltage is not available. Thus, while three-phase power conversion circuits frequently employ the Y-configuration since the availability of the neutral reference terminal simplifies circuit design, both configurations are used commercially.

The prior art contains several examples of three-phase power conversion circuits. One class of these prior art circuits utilizes a familiar three-phase full-wave rectifier circuit (see, e.g., element 1 in FIG. 2 of U.S. Pat. No. 4,545,464) followed by some sort of filtering or voltage regulating circuit. The following patents represent examples from this class: (1) U.S. Pat. No. 4,545,464 to Nomura, entitled APPARATUS FOR CONTROLLING AN A-C POWER ELEVATOR; (2) U.S. Pat. No. 4,853,557 to Meier et al., entitled AUTOMOTIVE ALTERNATOR POWER GENERATOR FOR WELDING OR USE OF POWER TOOLS; (3) U.S. Pat. No. 4,184,075 to Ebersberger, entitled X-RAY DIAGNOSTIC GENERATOR COMPRISING AN INVERTER FEEDING THE HIGH VOLTAGE TRANSFORMER; (4) U.S. Pat. No. 4,992,920 to Davis, entitled REGULATED AC POWER SYSTEM ENERGIZED BY VARIABLE SPEED PRIME MOVER; (5) U.S. Pat. No. 4,270,166 to Immler, entitled CIRCUIT ARRANGEMENT FOR PRODUCING A REGULATED HIGH DC VOLTAGE FROM A THREE-PHASE CURRENT; and (6) U.S. Pat. No. 4,599,687 to Smith, entitled ELECTRICAL POWER SUPPLY FOR A MOTOR VEHICLE.

These circuits based on three-phase full-wave rectifiers have several disadvantages, among which is that the three-phase full-wave rectifier circuit does not yield a sufficiently high DC voltage, thus requiring subsequent voltage doubling stages to meet common specifications. Typical rectifier based doubler circuits generate only about 150 VDC from a 115 VAC three-phase delta connection. Numerous applications, such as typical switching power supplies require approximately 300 VDC, and such conventional switching power supplies are not easily adaptable to 115 VAC three-phase delta connections, like those often used aboard a ship.

U.S. Pat. No. 3,764,886 to Zarowin, entitled THREE-PHASE VOLTAGE TRIPLING RECTIFIER CIRCUIT, describes a relatively simple diode and capacitor circuit for providing a high DC output from a three-phase AC input. Unfortunately, the Zarowin device requires a Y- as opposed to a Δ-connection.

Therefore, there remains a present need for a simple circuit capable of converting 115 VAC three-phase delta power to a nominal 300 VDC level. There exists a further need for such a device which maintains an equal loading on all three input lines. Still further, there remains a need for such a power converter utilizing a minimum number of capacitors, thereby ensuring a minimum package size.

These and other needs are satisfied, at least in part, by the invention as described broadly below and in greater detail with specific reference to a presently preferred embodiment thereof.

SUMMARY OF THE INVENTION

The invention provides a three-phase voltage doubler circuit capable of producing a nominal 300 VDC output from a 115 VAC three-phase Δ-connection. The voltage doubler includes (1) a means for coupling the most positive voltage of the three input phases to a positive DC output terminal, (2) a means for storing a voltage corresponding to the maximum voltage difference between one phase and the adjacent two phases of the input signal over a cycle and (3) a means for coupling the most negative voltage of the three input phases minus the stored negative voltage to a negative DC output terminal. Advantageously, voltage doublers constructed in accordance with the invention do not require a neutral input lead, a DC power source or any active components Further, such voltage doublers typically employ only three capacitors and present an equal electrical load at each of the three-phase input terminals.

Also a part of the present invention is a method for converting a three-phase Δ-connected AC supply to a higher DC voltage. In accordance with the invention, the method comprises the steps of (1) coupling the most positive voltage from among the three input phases to a positive DC output terminal, (2) storing a voltage related to the maximum voltage difference between one input phase and the other two input phases, and (3) coupling a voltage related to the most negative of the three input phases minus the stored voltage to a negative DC output terminal.

DESCRIPTION OF THE FIGURES

The presently preferred embodiment of the invention is described in detail below, which description is intended to be read in conjunction with the following Figures, in which.

DETAILED DESCRIPTION OF THE PREFERRED EMBODIMENTS

Figure 1:
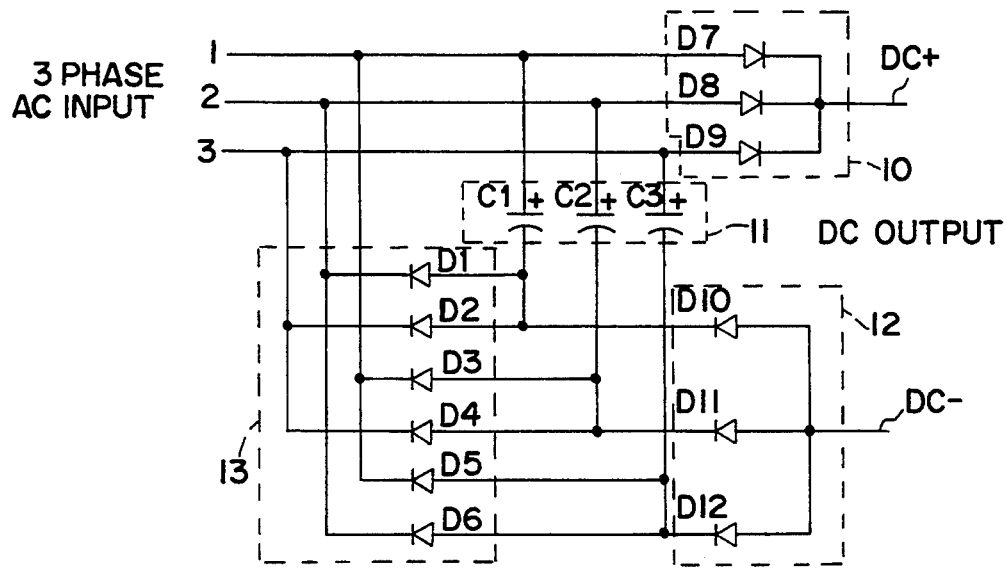
FIG. 1 depicts the preferred embodiment of a three-phase voltage doubling circuit in accordance with the present invention.

Reference is now made to FIG. 1, which depicts a preferred embodiment of a voltage doubler circuit in accordance with the invention. The preferred embodiment comprises twelve diodes, which may be individual elements or combined into one or more monolithic modules, and three capacitors.

Three phases of the AC input are applied at leads 1, 2 and 3. Diodes D7–D9 form a first rectifying means 10, which couples the maximum voltage from among input leads 1–3 to the positive DC output lead DC+. Capacitors C1–C3, the positive terminals of which attach to input leads 1–3, comprise a charge storage means 11. A second rectifying means 12, comprising diodes D10–D12, connects the negative terminals of capacitors C1–C3 to a negative DC output terminal DC−. A third rectifying means 13, illustratively but not necessarily comprising diodes D1–D6, couples the negative terminals each of capacitors C1–C3 to the input leads other than that to which the capacitors C1–C3 to the input leads other than that to which the capacitor's positive terminal is connected.

Figure 3:
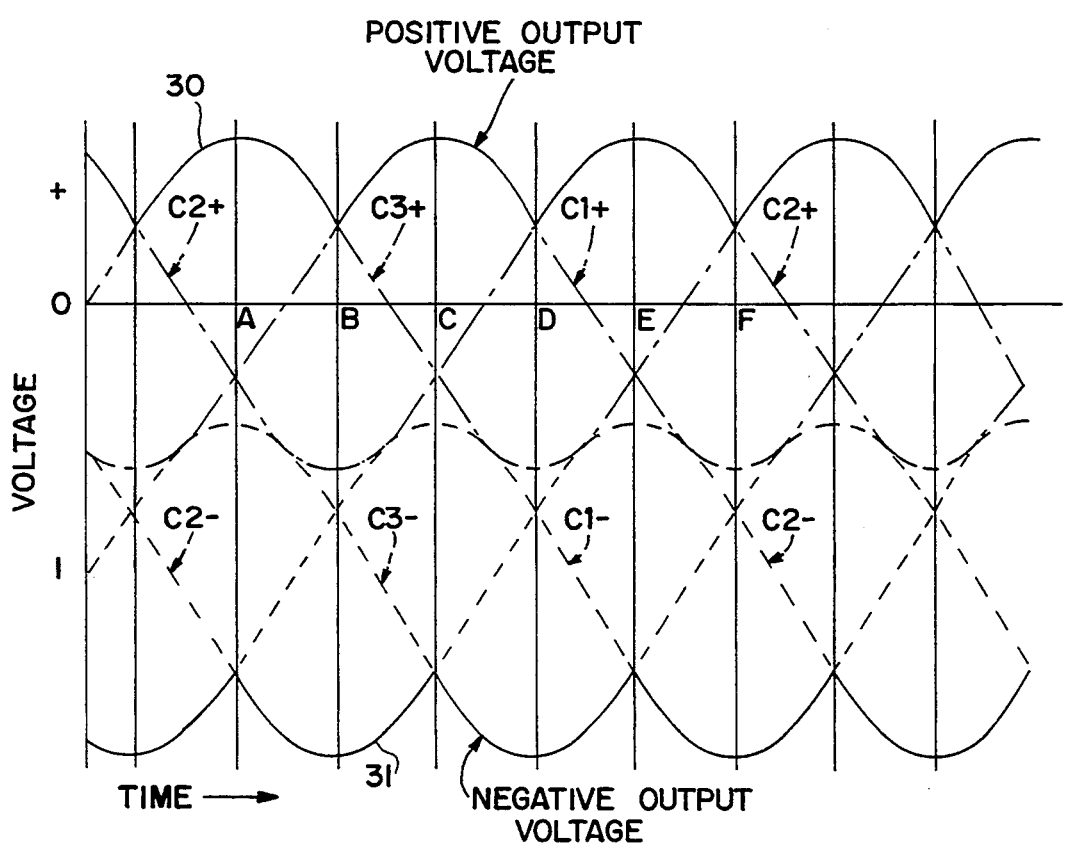

The circuit operates generally as follows. First rectifying means 10 continuously couples the most positive (but not necessarily the maximum or greatest magnitude) instantaneous voltage (at any given instant in time) from input leads 1–3 to positive output terminal DC+ (this is depicted as waveforms 30 of FIG. 3). Second rectifying means 12 couples the most negative voltage at the negative terminals of capacitors C1–C3 to negative DC output terminal DC−. Capacitors C1–C3 are selected such that they do not discharge substantially during the AC cycle. Due to symmetry, capacitors C1–C3 each maintain approximately equal voltages. Thus, second rectifying means 12 effectively couples a voltage corresponding to the most negative of the three input leads 1–3 minus the voltage stored on charge storage means 11 to terminal DC− (see waveform 31 of FIG. 3). This voltage developed between terminals DC+ and DC− is approximately twice that developed by the conventional three-phase full-wave rectifier circuit.

Figure 2:
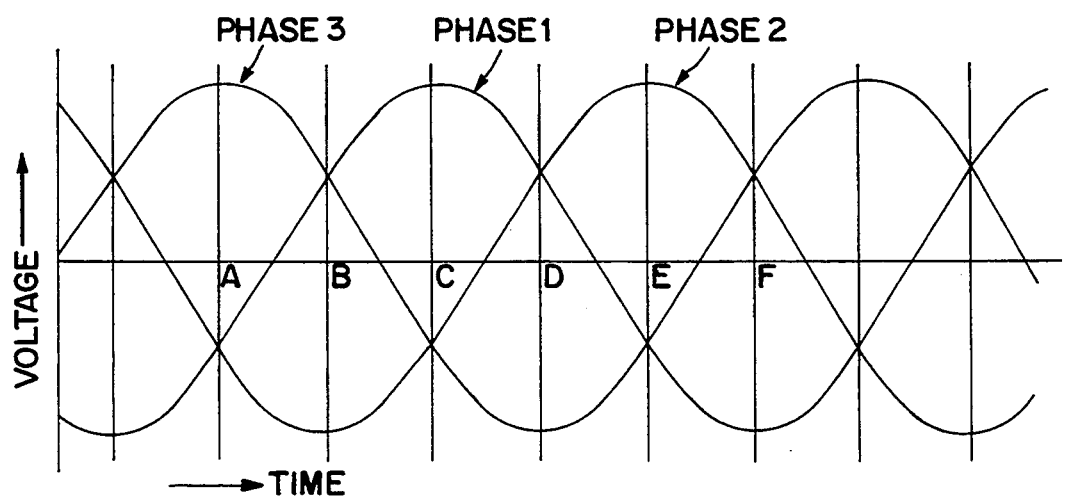
FIG. 2 depicts the voltage waveforms for the three phases of the AC input signal applied to the circuit in FIG. 1; and, FIG. 3 depicts the voltage waveforms for the DC output terminals and various internal nodes of the circuit of FIG. 1.

Consider now the charging of capacitors C1–C3. FIG. 2 depicts the voltage waveforms of the three-phase AC inputs at leads 1, 2 and 3. C1 is charged when phase 1 input is more positive than phases 2 and 3. When phase 2 is the most negative, D1 conducts to charge C1 and, when phase 3 is the most negative, D2 conducts. Diode conduction only occurs when the instantaneous phase 2 or 3 input voltages exceed (by diode threshold) the negative voltage at the negative terminal of capacitor C1. In practice, when C1 is large and does not discharge significantly during each cycle, the charging current drawn through diode D1 occurs around the midpoint between times B and C (of FIG. 2) and that through D2 around the midpoint between times D and E.

Because of symmetry, capacitors C1–C3 all charge to the same voltage. C2 charges through diodes D3 and D4; C3 charges through diodes D5 and D6.

The circuit may be simplified by removing diodes D2, D3 and D6, because there is a duplication in the charging paths for capacitors C1, C2 and C3. As previously noted, C1 charges through D2 at the midpoint between times B and C, and later again, through D2 at the midpoint between times C and D. However, since C1 will not begin to discharge into the load until time E, the second charging event through D2 is superfluous. A similar reasoning applied to diodes D3 and D6.

The preferred embodiment includes diodes D2, D3 and D6 for two reasons. First, circuit impedances limit the charging ability of individual diodes, and thus the allocation of more time for charging by the additional diodes reduces component stress and increases efficiency. Second, the presence of the extra diodes ensures that the currents drawn from the three input phases occur at the same time regardless of which phase is connected to each input respective input.

The operation of the doubler circuit can be analyzed in detail as follows. Consider first the condition where the phase 1 voltage becomes the most positive (i.e., time B in FIG. 2). With the voltage between phases 1 and 2 increasing, diode D1 conducts to charge capacitor C1. At the same time, the positive voltage on phase 1 causes diode D7 to conduct to provide the positive output at terminal DC+. In a 115 VAC line-to-line delta system (i.e., 66.4 VAC line-to-neutral), the DC+ terminal reaches a maximum value of 93.9 Volts. When phase 1 begins to decrease, the negative charge on capacitor C1 drives the cathode of diode D10 (assuming that C1 is large and does not substantially discharge) down to a voltage approximately equal to −(max. voltage between phases 1 and 2)−(max. negative voltage of phase 1). This maximum negative voltage at the cathode of D10 (and at the DC− terminal) is equal to the (line-to-neutral voltage)×sqrt(2)×(1+cos (30°)), which, in this case, computes to −256.6 Volts.

The positive output voltage DC+ at time F is that of phases 2 and 3, which equals the (line-to-neutral voltage)×sqrt(2) / 2. In the 115 VAC delta system, this computes to +46.9 Volts. Thus, the voltage measured across the DC+ and DC− output terminals at time F is 303.5 Volts.

The same analysis applies for capacitor C2 with diodes D4 and D11 and for capacitor C3 with diodes D5 and D12. The remaining diodes D2, D3 and D6 come into play if the phase inputs are connected in reverse order, as previously noted.

Returning to the description involving capacitor C1, a similar output voltage occurs at time A. Here the positive output DC+ is taken from phase 3 and equals the (line-to-neutral voltage)×sqrt(2), which computes to 93.9 Volts in the 115 VAC delta system. The negative output DC− at time F equals the (neg. voltage on phase 1)−(voltage on capacitor C1), which also equals the maximum line-to-line voltage, which also equals the (line-to-neutral voltage)×sqrt(3)×sqrt(2). In the 115 VAC delta system, this DC− terminal voltage at time F computes to 209.6 Volts.

Under these conditions, the DC output is 303.5 Volts. A similar reasoning applies to other phases.

The maximum DC output voltages occur at times representing phases of ±30° from times A, C, E, etc. The positive DC+ terminal voltage at these times is the (line-to-neutral voltage)×sqrt(2)×cos(30°); the negative DC− terminal voltage is the (line-to-neutral voltage)×sqrt(2)×(cos (30°)+sqrt(3)). The maximum DC output for the 115 VAC delta system thus computes to 325.3 Volts.

In a practical system, capacitors C1, C2 and C3 will have limited capacitance and will partially discharge during each cycle. Accordingly, the DC output voltages will consequently decrease and output ripple will increase.

The circuit of FIG. 1 can, of course, be inverted —i.e., diodes D1–D12 reversed; the polarities of C1–C3 reversed; and output terminals DC+ and DC− interchanged —and still achieve the same effects. It is understood that all claims shall cover the inverted configuration at least by equivalence.

The foregoing sections have described the invention with the aim of disclosing in sufficient detail to one skilled in the art the best mode known to the inventor of practicing the invention. The scope of this invention, however, shall be defined exclusively by the following claims.

What is claimed is:

1. A three-phase voltage doubler circuit comprising:
   (a) first, second and third input leads, each receiving a different phase of a three-phase input signal;
   (b) first, second and third charge storage means, each having a positive and a negative terminal, said positive terminals of said first, second and third charge storage means being coupled to said first, second and third input leads, respectively, wherein said charge storage means store charges indicative of maximum voltage differences generated across said first, second and third input means;
   (c) positive and negative output leads providing an output signal therebetween;
   (d) first rectifying means, coupled to said positive output lead, for providing at said positive output lead a signal representative of the most positive of the voltages on said first, second and third input leads;
   (e) second rectifying means, coupled to said negative output lead, for providing at said negative output lead a signal representative of the most negative of the voltages on said first, second and third input leads minus the voltages stored on said first, second and third charge storage means, respectively; and,
   (f) third rectifying means, coupled between said negative terminals of said first, second and third charge storage means and said first, second and third input leads, for charging said first, second and third charge storage means such that the voltages between said positive and negative terminals thereof corresponds to said maximum voltage differences generated by the signals received at said input leads, and
   (g) wherein a terminal of said second rectifying means is connected to said negative terminals of said first, second and third charge storage means, and wherein said terminal is further connected to said third rectifying means associated with said first, second and third input leads.

2. A three-phase voltage doubler circuit as defined by claim 1, wherein said first, second and third charge storage means are capacitors.

3. A three-phase voltage doubler circuit as defined by claim 1, wherein said first rectifying means comprises three diodes.

4. A three-phase voltage doubler circuit as defined by claim 1, wherein said second rectifying means comprises three diodes.

5. A three-phase voltage doubler circuit as defined by claim 1, wherein said third rectifying means comprises three diodes, each connected between said negative terminal of a different one of said first, second and third charge storage means and a different one of said input leads.

6. A three-phase voltage doubler circuit as defined by claim 1, wherein said third rectifying means comprises six diodes, each connected between said negative terminal of one of said first, second and third charge storage means and one of said input leads.

7. A method of providing a DC output signal, across positive and negative output leads, from a three-phase AC input signal, received on first, second and third input leads, said method comprising the steps of:
   (a) coupling the most positive voltage from among said first, second and third input leads to said positive output lead, by way of a first set of at least three conducting rectifier means;
   (b) charging a charge storage means to a voltage corresponding to the maximum voltage difference between said first, second and third input leads, by connecting said charge storage means to said first, second and third input leads and by further connecting said charge storage means to at least six conducting rectifier means; and
   (c) coupling to the negative output lead a voltage related to the most negative voltage among said first, second and third input leads minus the voltage stored on said charge storage means, by way of a second set of at least three conducting rectifier means.

8. A method of providing a DC output signal as defined by claim 7, wherein step (a) includes coupling via three diodes.

9. A method of providing a DC output signal as defined by claim 7, wherein step (b) includes connecting a first terminal of said charge storage means to an input lead and coupling, via a diode, a second terminal of said charge storage means to a different input lead.

10. A method of providing a DC output signal as defined by claim 9, wherein step (c) includes coupling, via a diode, said second terminal of said charge storage means to said negative output terminal.

11. A method of providing a DC output signal as defined by claim 7, wherein step (c) includes coupling, via a diode, a terminal of said charge storage means to said output lead.

12. An electronic circuit operating from a Δ-connected supply comprising:
   (a) first, second and third input leads;
   (b) positive and negative output leads;
   (c) first, second and third diodes connected between said first, second and third input leads, respectively, and said positive output lead;
   (d) first, second and third capacitors, each having positive and negative terminals, the positive terminals being connected to said first, second and third input leads, respectively, wherein said charge storage means store charges indicative of maximum voltage differences generated across said first, second and third input means;
   (e) fourth, fifth and sixth diodes, connected between said negative terminals of said first, second and third capacitors, respectively, and said negative output lead;
   (f) seventh, eighth and ninth diodes, connected between said negative terminals of said first, second and third capacitors, respectively, and said second, third and first leads, respectively; and,
   (g) tenth, eleventh and twelfth diodes, wherein terminals of said tenth, eleventh and twelfth diodes are connected to said negative terminals of said first, second and third capacitors, respectively, and wherein said terminals are further connected to rectifying means associated with said second and third input leads, said first and third input leads, and said first and second input leads, respectively.

13. An electronic circuit as defined by claim 12, wherein said first, second and third capacitors have approximately equal capacitance.

14. An electronic circuit as defined by claim 12, wherein said diodes are semiconductors diodes.

15. An electronic circuit as defined by claim 12, wherein said diodes are thermionic diodes.

16. An electronic circuit as defined by claim 12, wherein the capacitance of said capacitors is large enough that said capacitors do not discharge significantly during the operation of said electronic circuit.

17. An electronic circuit as defined by claim 12, wherein said first, second and third input leads receive three phases of a delta AC power signal.

18. An electronic circuit as defined by claim 17, wherein said circuit presents and approximately equal electrical load at each of said input leads.

* * * * *